US 8,068,041 B2

Nov. 29, 2011

(12) United States Patent
Dabov

(10) Patent No.: US 8,068,041 B2
(45) Date of Patent: Nov. 29, 2011

(54) HANDHELD ELECTRONIC DEVICE AND KEYPAD HAVING TACTILE FEATURES

(75) Inventor: Teodor Dabov, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 709 days.

(21) Appl. No.: 12/142,510

(22) Filed: Jun. 19, 2008

(65) Prior Publication Data

US 2008/0246635 A1    Oct. 9, 2008

Related U.S. Application Data

(63) Continuation of application No. 11/145,370, filed on Jun. 3, 2005, now Pat. No. 7,433,719.

(51) Int. Cl.
*H03K 17/01* (2006.01)
(52) U.S. Cl. ............ 341/22; 341/20; 345/168; 345/169; 345/170; 345/171; 345/172; 455/575.1; 455/575.2; 455/575.3; 455/575.4; 455/575.5; 455/575.6; 455/575.7; 455/575.8; 455/575.9
(58) Field of Classification Search .................... 341/20, 341/22; 345/168–172; 455/575.1–575.9
See application file for complete search history.

(56) References Cited

U.S. PATENT DOCUMENTS

| 4,197,586 | A | | 4/1980 | Nidiffer |
| 4,430,531 | A | | 2/1984 | Wright |
| 5,336,001 | A | * | 8/1994 | Lichtenberg .................. 400/489 |
| 5,496,982 | A | * | 3/1996 | Tsai .............................. 200/345 |
| 5,861,823 | A | * | 1/1999 | Strauch et al. ................. 341/22 |
| 6,183,149 | B1 | | 2/2001 | Caplan |
| 6,304,431 | B1 | * | 10/2001 | Kim ......................... 361/679.09 |
| 6,377,685 | B1 | | 4/2002 | Krishnan |
| 6,677,541 | B1 | * | 1/2004 | Rapeli ........................... 200/5 A |
| 6,771,191 | B2 | * | 8/2004 | Motoe ............................. 341/22 |
| 6,911,608 | B2 | * | 6/2005 | Levy ............................. 200/5 A |
| 7,056,043 | B2 | * | 6/2006 | Pletikosa ...................... 400/472 |
| 7,433,719 | B2 | * | 10/2008 | Dabov ....................... 455/575.1 |
| 7,502,462 | B2 | * | 3/2009 | Rak et al. ................. 379/433.07 |
| 2003/0043123 | A1 | | 3/2003 | Hinckley et al. |
| 2003/0058139 | A1 | | 3/2003 | Sakurai |
| 2003/0197627 | A1 | * | 10/2003 | Botich ............................ 341/22 |
| 2005/0231486 | A1 | * | 10/2005 | Wiggeshoff .................. 345/168 |

FOREIGN PATENT DOCUMENTS

| DE | 101 28 908 A1 | | 12/2002 |
| EP | 0 654 727 A | | 5/1995 |
| EP | 1 156 643 A | | 11/2001 |
| FR | 2 435 353 A | | 4/1980 |
| FR | 2435353 A | * | 5/1980 |
| GB | 2 084 802 A | | 4/1982 |
| GB | 2 402 650 A | | 12/2004 |
| JP | 57-087383 A | | 5/1982 |
| WO | 81/02272 A | | 8/1981 |

* cited by examiner

*Primary Examiner* — Brian Zimmerman
*Assistant Examiner* — Amine Benlagsir
(74) *Attorney, Agent, or Firm* — Louis B. Allard; Borden Ladner Gervais LLP

(57) ABSTRACT

An improved handheld electronic device and keypad include tactile features that help a user to identify certain keys of the keypad. In the present exemplary embodiment, the keypad includes keys in a predetermined region that can be employed during a telephone operation. The keypad additionally includes other keys outside the predetermined region. The keys in the predetermined region include tactile features that enable the user to identify and actuate the keys in the predetermined region during a telephone operation with the user directing minimal visual attention to the handheld electronic device.

20 Claims, 3 Drawing Sheets

HANDHELD ELECTRONIC DEVICE AND KEYPAD HAVING TACTILE FEATURES

CROSS-REFERENCE TO RELATED APPLICATION

This application is a continuation of U.S. patent application Ser. No. 11/145,370 filed on Jun. 3, 2005, now U.S. Pat. No. 7,433,719 the disclosures of which are incorporated herein by reference.

BACKGROUND

1. Field

The invention relates generally to handheld electronic devices and, more particularly, to a handheld electronic device having a keypad that includes tactile features.

2. Background

Numerous types of handheld electronic devices are known. Examples of handheld electronic devices include, for instance, personal data assistants (PDAs), handheld computers, two-way pagers, cellular telephones, and the like. Many handheld electronic devices also feature wireless communication capability.

Handheld electronic devices are generally intended to be portable and thus are of a relatively compact configuration in which keys and other input devices often perform multiple functions under certain circumstances or may otherwise have multiple aspects or features assigned thereto. For instance, a handheld electronic device may include a keypad having a plurality of keys, with certain of the keys being usable for entering text during a text entry operation, and with the same keys being further usable for dialing a telephone number during a telephone operation. While such handheld electronic devices have been generally effective for their intended purposes, such devices have not, however, been without limitation.

Some handheld electronic devices are configured to include a keypad that includes keys in addition to such keys that can be employed both during a text entry operation and during a telephone operation. Additionally or alternatively, the keys that can be employed during the telephone operation may be disposed adjacent one another with minimal space therebetween. A user of such a handheld electronic device can experience difficulty dialing a telephone number while driving since the user's eyes desirably will not leave the road while dialing. Known keypads have provided few, if any, features that might enable a user to dial a telephone number without looking directly at the handheld electronic device. It thus would be desirable to provide an improved handheld electronic device and a keypad that provide features that help a user dial a telephone number.

SUMMARY

An improved handheld electronic device and keypad include tactile features that help a user to identify certain keys of the keypad. In the present exemplary embodiment, the keypad includes keys in a predetermined region that can be employed during a telephone operation. The keypad additionally includes other keys outside the predetermined region. The keys in the predetermined region include tactile features that enable the user to identify and actuate the keys in the predetermined region during a telephone operation with the user directing minimal visual attention to the handheld electronic device.

Accordingly, an aspect of the invention is to provide an improved handheld electronic device and a keypad wherein the keypad includes tactile features that enable a user to distinguish keys that are disposed in a predetermined region of the keypad from other keys of the keypad that are disposed outside the predetermined region.

Another aspect of the invention is to provide an improved handheld electronic device and keypad that facilitate operation of the device during a telephone operation.

Another aspect of the invention is to provide an improved handheld electronic device and keypad wherein the keypad is configured to enable the user to easily identify various keys in a predetermined region of the keypad with the user directing minimal visual attention to the handheld electronic device.

Accordingly, an aspect of the invention is to provide an improved keypad for a handheld electronic device, in which the general nature of the keypad can be stated as including a number of keys arranged in a plurality of rows and a plurality of columns, with each key having an engagement surface that is structured to be engaged by a user in actuating the key and a skirt surface adjacent the engagement surface. Each key of at least a portion of the number of keys includes a first portion and a second portion, with the first portion having a first surface, and with the second portion having a second surface. At least a portion of the first surface disposed adjacent at least a portion of the second surface is disposed oblique to the at least a portion of the second surface. At least a portion of the second surface is disposed adjacent at least a portion of the skirt surface. At least a portion of each of the first and second surfaces are at least a portion of the engagement surface of the key. At least a portion of a first surface of a key disposed in a predetermined row and in a predetermined column is disposed adjacent at least a portion of a first surface of an adjacent key in the predetermined row. At least a portion of the first surface of the key disposed in the predetermined row and in the predetermined column is offset in an actuation direction from at least a portion of an engagement surface of an adjacent key in the predetermined column and is disposed adjacent at least a portion of a skirt surface of the adjacent key in the predetermined column to provide a tactile distinction between the key disposed in the predetermined row and in the predetermined column and the adjacent key in the predetermined column. At least a first key of the at least a portion of the number of keys additionally comprising a third portion. The at least a first key is disposed in a given row. The third portion includes a tactile feature structured to provide a tactile distinction between the at least a first key and an adjacent key in the given row.

Other aspects of the invention are provided by an improved handheld electronic device, the general nature of which can be stated as including a processor apparatus, an input apparatus, and an output apparatus. The processor apparatus includes a processor and a memory. The input apparatus is structured to provide input to the processor apparatus. The output apparatus is structured to receive signal from the processor apparatus and to provide output. The input apparatus includes a keypad that includes a number of keys arranged in a plurality of rows and a plurality of columns, with each key having an engagement surface that is structured to be engaged by a user in actuating the key and a skirt surface adjacent the engagement surface. Each key of at least a portion of the number of keys includes a first portion and a second portion, with the first portion having a first surface, and with the second portion having a second surface. At least a portion of the first surface disposed adjacent at least a portion of the second surface is disposed oblique to the at least a portion of the second surface. At least a portion of the second surface is disposed adjacent at least a portion of the skirt surface. At least a portion of each of the first and second surfaces are at least a portion of the engagement surface of the key. At least a portion of a first surface of a key disposed in a predetermined row and in a predetermined column is disposed adjacent at least a portion of a first surface of an adjacent key in the predetermined row. At least a portion of the first surface of the key disposed in the predetermined row and in the predetermined column is offset in an actuation direction from at least a portion of an engagement surface of an adjacent key in the predetermined column and is disposed adjacent at least a portion of a skirt surface of the adjacent key in the predetermined column to provide a tactile distinction between the key disposed in the predetermined row and in the predetermined column and the adjacent key in the predetermined column. At least a first key of the at least a portion of the number of keys additionally comprising a third portion. The at least a first key is disposed in a given row. The third portion includes a tactile feature structured to provide a tactile distinction between the at least a first key and an adjacent key in the given row.

BRIEF DESCRIPTION OF THE DRAWINGS

A further understanding can be gained from the following Description when read in conjunction with the accompanying drawings in which.

Similar numerals refer to similar parts throughout the specification.

DESCRIPTION

Figure 1:
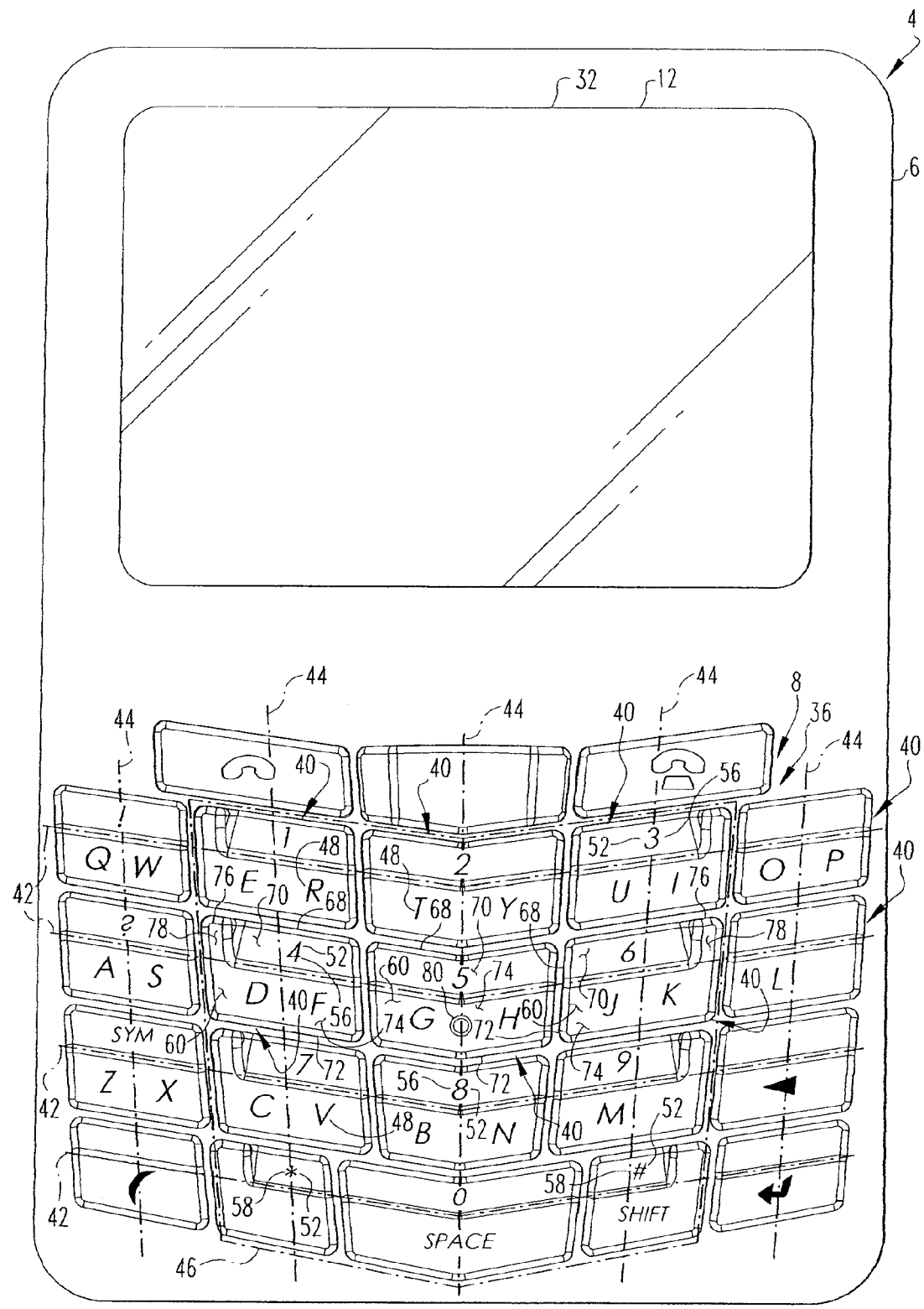
FIG. 1 is a front elevational view of an improved handheld electronic device in accordance with the invention that comprises an improved keypad in accordance with the invention.
Figure 2:
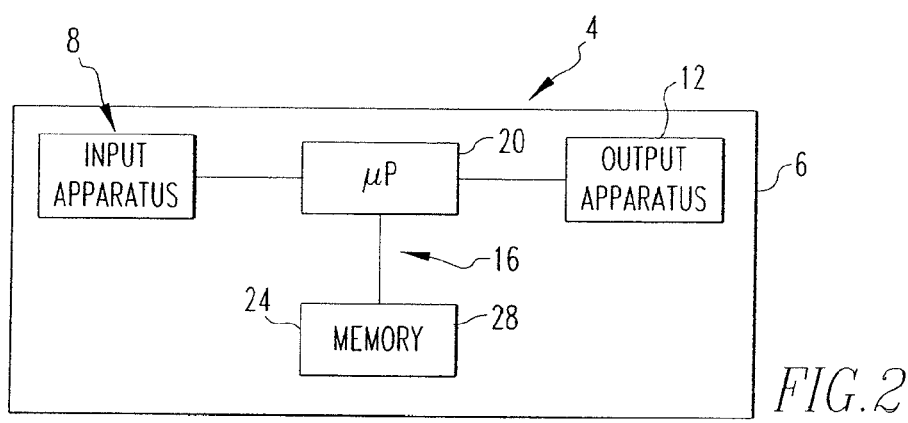
FIG. 2 is a schematic view of the handheld electronic device of FIG. 1.

An improved handheld electronic device 4 in accordance with the invention is depicted generally in FIG. 1 and is depicted schematically in FIG. 2. The handheld electronic device 4 includes a housing 6, and further includes an input apparatus 8, an output apparatus 12, and a processor apparatus 16 disposed on the housing. The processor apparatus 16 includes a processor 20 and a memory 24. The processor 20 may be, for instance and without limitation, a microprocessor (μP) that is responsive to inputs from the input apparatus 8 and provides output signals to the output apparatus 12. The memory 24 can include any one or more of RAM, ROM, EPROM, and/or EEPROM without limitation. The memory 24 includes a number of routines 28 stored therein that are executable on the processor 20. As employed herein, the expression "a number of" and variations thereof shall refer broadly to any nonzero quantity, including a quantity of one. The routines 28 in the present exemplary embodiment include a telephone routine that is executable on the processor 20 to initiate and carry on a telephone call. Examples of handheld electronic devices are included in U.S. Pat. Nos. 6,452,588 and 6,489,950.

As can be seen in FIG. 1, the output apparatus 12 includes a display 32. The output apparatus 12 can additionally or alternatively include other output devices such as lights, speakers, and the like without limitation.

The input apparatus 8 includes a keypad 36 comprising a plurality of keys 40 arranged in a plurality of rows 42 and a plurality of columns 44. The keypad 36 in the present exemplary embodiment is a bridgeless keypad, meaning that no frame portions exist between adjacent keys 40. A plurality of the keys 40 are disposed in a predetermined region 46 of the keypad which, in the present exemplary embodiment, is a telephone keypad. In this regard, it can be seen that many of the keys 40 have one or two linguistic elements 48 assigned thereto. The present exemplary linguistic elements 48 are in the form of Latin letters, although in other embodiments the linguistic elements 48 could be other letters or characters, ideograms, strokes, and the like without limitation.

The keys 40 disposed within the region 46 each additionally have a telephone input character 52 assigned thereto. The exemplary telephone input characters 52 depicted herein include the ten Arabic digits 56 numbered "0" through "9", and further include a pair of symbols 58 which, in the present exemplary embodiment, are an asterisk "*" and a pound sign "#". The telephone input characters 52 are assigned to the keys 40 within the predetermined region 46 in such a fashion that the keys 40 within the predetermined region 46 are arranged in a conventional touch-tone telephone configuration. When the telephone routine of the routines 28 is active on the processor 20, an actuation of any of the keys 40 in the predetermined region 46 will be detected by the processor 20 as being an input of the telephone input character 52 assigned to the actuated key 40.

Figure 3:
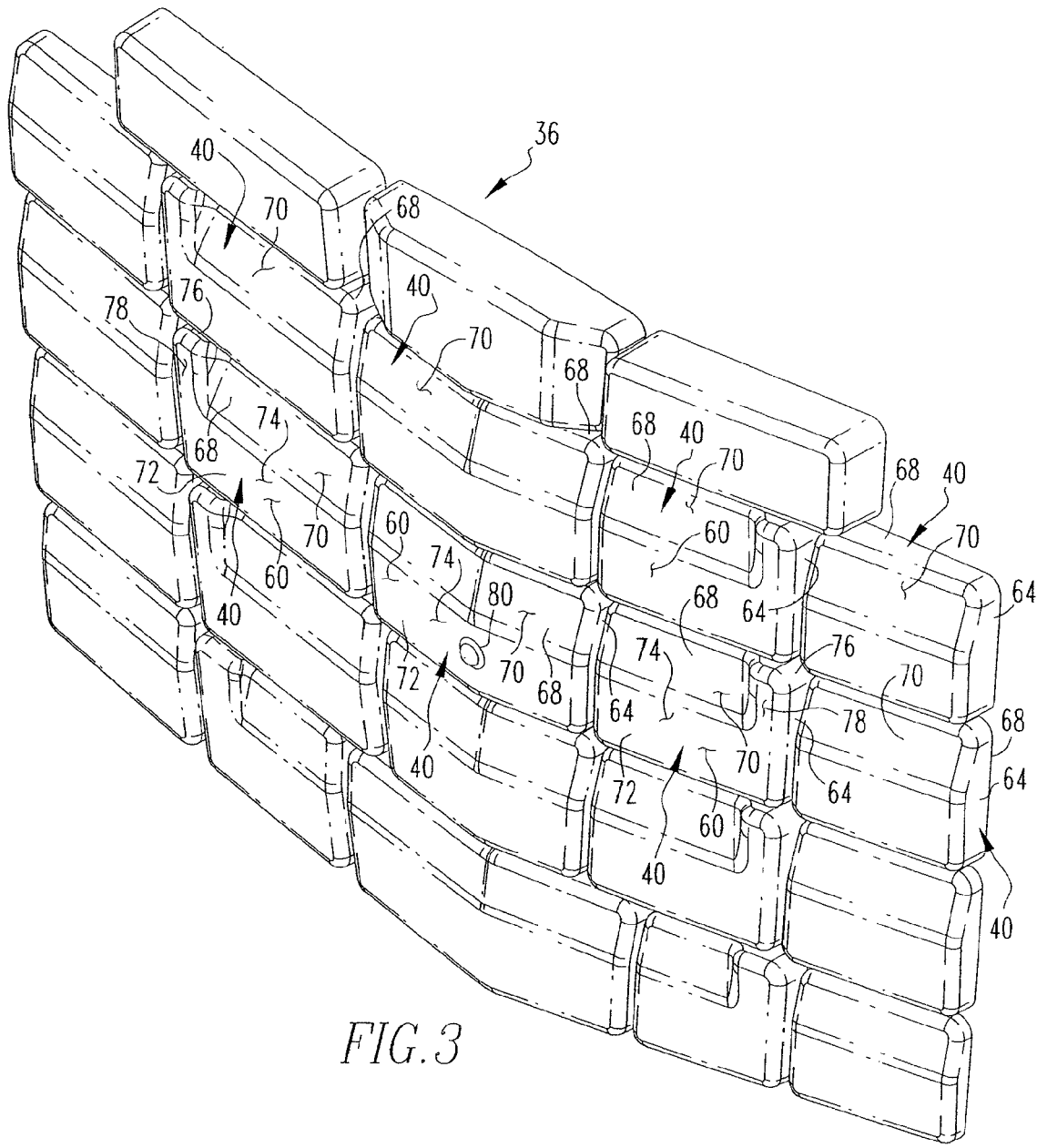
FIG. 3 is a perspective view of the keypad.
Figure 4:
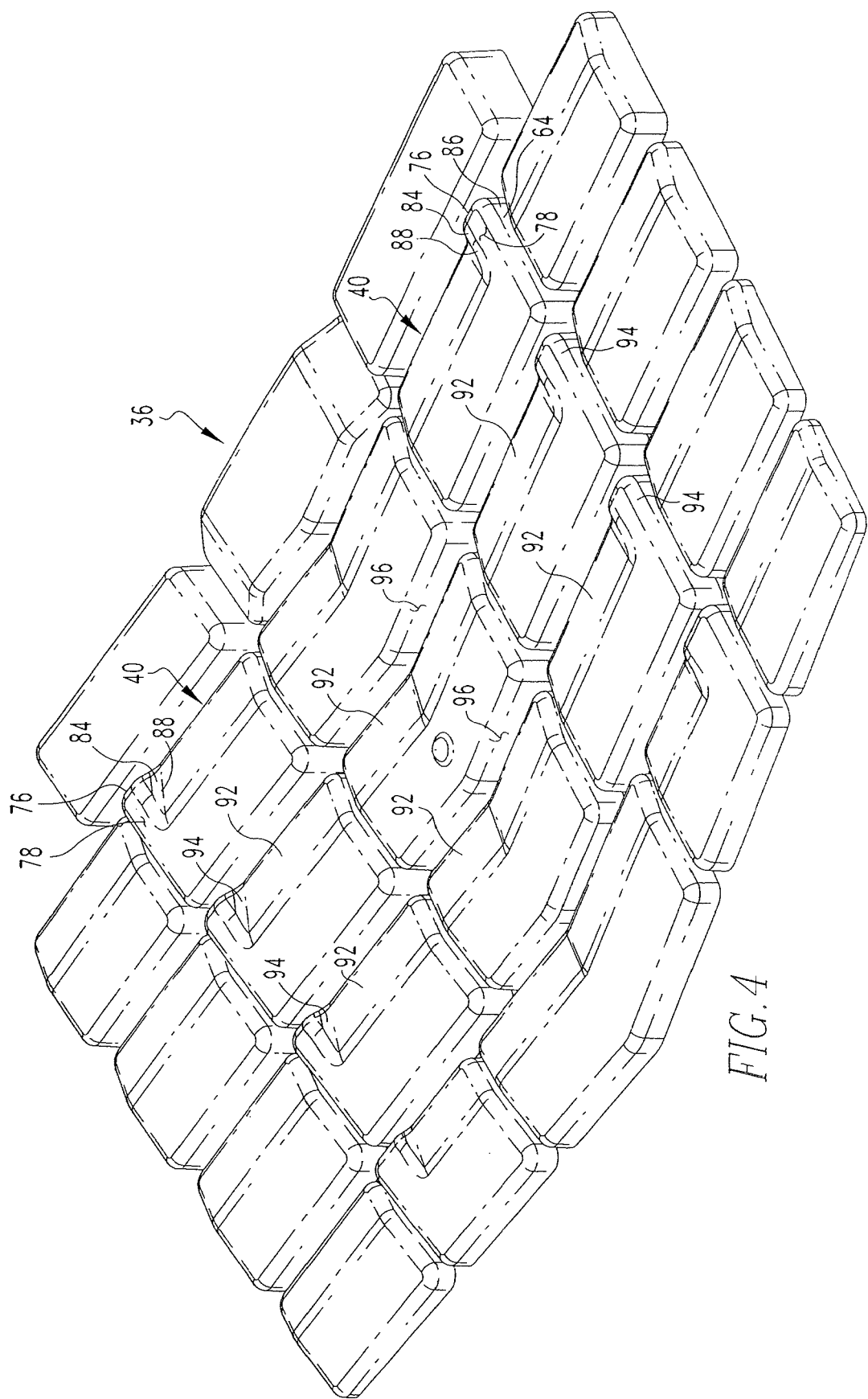
FIG. 4 is another perspective view of the keypad.

Each key 40 includes an engagement surface 60 and a skirt surface 64 (FIGS. 3 and 4). The engagement surface 60 is engageable by a user to actuate the key 40. The key 40 is actuated by the user in an actuation direction which, in the exemplary embodiment depicted herein, is directly into the page of FIG. 1. At least a portion of the skirt surface 64 of each key 40 is oriented generally parallel with the actuation direction, and this helps to avoid interference between adjacent keys 40 when one of the adjacent keys 40 is being actuated.

As can be understood from FIGS. 1 and 3-4, many of the keys 40 include a first portion 68 having a first surface 70, and further include a second portion 72 having a second surface 74. The first and second surfaces 70 and 74 are each a part of the engagement surface 60 of the key 40. As can be best understood from FIGS. 3 and 4, the first surface 70 is oriented oblique to the second surface 74. As employed herein, the expression "oblique" and variations thereof shall refer broadly to a relationship that is neither perpendicular nor parallel and does not imply or require planar shapes.

As can be best understood from FIGS. 3 and 4, the first surfaces 70 of the keys 40 are generally each disposed adjacent another key 40 in the same column, but the portion of the first surface 70 adjacent the adjacent key 40 is offset in the actuation direction from the engagement surface 60. More particularly, the first surface 70 is adjacent the skirt surface 64 of the adjacent key 40.

Some of the keys 40 within the predetermined region 46 additionally include a third portion 76 having a third surface 78. The third surface 78 is a portion of the engagement surface 60 of the key. In the present exemplary embodiment, the third portion 76 is a protrusion that protrudes from key 40 at a location adjacent the first surface 70. One of the keys 40 within the predetermined region 46 includes a Braille dot 80 which is a protrusion that protrudes outwardly from the second surface 74.

Each third surface 78 can be said to include a first lateral surface 84 (FIG. 4) and a second lateral surface 86. The first lateral surfaces 84 of the various keys 40 face generally toward the column 44 within which the key 40 having the Braille dot 80 is disposed. The second lateral surfaces 86 face away from the column 44 within which the key 40 having the Braille dot 80 is disposed. The first lateral surface 84 has a first profile, and the second lateral surface 86 has a second profile. It can be seen that the first profiles are different than the second profiles. It can be seen, however, that the first profiles of the first lateral surfaces of the keys 40 within any given row 40 generally face one another and are alike. In the present exemplary embodiment, the first profiles are alike in that they are mirror images of one another.

Part of the reason the first profile of the first lateral surface 84 is different than the second profile of the second lateral surface 86 is that the key 40 includes a fillet 88 adjacent the first surface 70. The first lateral surface extends from the first surface 70 across the fillet 80. In contrast, the second lateral surface 86 is a portion of the skirt surface 64 of the key 40. The fillet 88 provides to the first lateral surface 84 a transition from the first surface 70 into the protrusion provided by the third portion 76.

It thus can be seen that the offsetting of the first surfaces 70 from the engagement surfaces 60 of adjacent keys 40 provides a first tactile feature 92 to each such key 40 having an offset first surface 70, with the first tactile feature 92 providing a tactile distinction between the key having the offset first surface 70 and the adjacent key 40 having the engagement surface 60 from which the aforementioned first surface 70 is offset in the actuation direction. The first tactile features 92 thus provide a tactile differentiation between adjacent keys 40 when moving between keys along the direction of any of the columns 44.

The third portions 76 each provide a second tactile feature 94 that can be perceived by a user when moving among adjacent keys 40 within any particular row 42. Moreover, since the first profiles of the first lateral surfaces 84 are different than the second profiles of the second lateral surfaces 86, the user additionally can detect on which side of a third portion 76 the user is touching, such as with the user's finger, which enables the user to distinguish a key 40 that includes a third portion 76 and is disposed in any particular row 42 from the other key 40 in the same row 42 and having a third portion 76. The Braille dot 80 provides an alternate tactile feature which enables the user to identify the key 40 on which the Braille dot 80 is disposed and to distinguish such key 40 from other keys in the same column 44.

It is noted that the third portions 76 are depicted herein as being protrusions extending outwardly from a location adjacent the first surface 70. It is noted, however, that the third portions 76 could be of other configurations that still provide a tactile distinction between them and an adjacent key 40 without departing from the present concept.

It also can be seen that the first surfaces 70 of the keys 40 in any given row 42 within the predetermined region 46, along with the adjacent portions of the skirt surfaces 64 of keys 40 adjacent thereto, form a channel 96 that is open and extends substantially continuously between the third portions 76 of the keys 40 in such row 42. The channels 96, in combination with the third portions 76 at alternate ends of such channels 96, enable the user to rapidly ascertain the bounds of the predetermined region 46 and to thereby facilitate actuation of desired keys 40 during a telephone operation.

As can be seen in FIGS. 3 and 4, a portion of the third surface 78 of any given key 40 is oriented substantially coplanar with the second surface 74 of such key. The first surface 70 of such a key 40 can thus be seen as being almost an indentation in to the key 40. It is understood, however, that other configurations can be employed without departing from the present concept.

The first and second tactile features 92 and 94 thus enable a user to distinguish the keys 40 within the predetermined region 46 from keys 40 outside the predetermined region 46. Additionally, the first and second tactile features 92 and 94 enable the user to distinguish among keys 40 within the predetermined region 46 in directions both along the columns 44 as well as along the rows 42. This is particularly advantageous in the present exemplary keypad 36 which includes, in addition in addition to the three columns 44 within the predetermined region 46, a pair of columns 44 that are disposed at alternate sides of the predetermined region 46, whereby the predetermined region 46 is disposed between such additional columns 44. By providing the third portions 76, the user can rapidly distinguish between keys 40 inside the predetermined region 46 and keys outside the predetermined region 46 to facilitate actuation of keys 40 during the telephone operation.

It can further be seen that the telephone input characters 52 are disposed on the first surfaces 70 of the keys 40. Since the first surfaces 70 are oriented oblique to the second surfaces 74, the user can quickly identify the telephone input characters 52 and the keys 40 upon which such telephone input characters 52 are disposed merely by slightly reorienting the handheld electronic device 4 with respect to a light source so that light shines on the first surfaces 70 differently than on the second surfaces 74. The user therefore can advantageously rapidly distinguish between the keys 40 having a telephone input character 52 assigned thereto and those not having such a telephone input character 52 assigned thereto to facilitate a telephone operation. In this regard, the telephone input characters 52 need not be printed in a different color than the linguistic elements 48 and other symbols, etc., to achieve highlighting, in effect, to the user's attention. This enables a cost savings resulting from printing on the device 4 in fewer colors.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A keypad for a handheld electronic device, the keypad comprising:

a number of keys arranged in a plurality of rows and a plurality of columns, each key having an engagement surface that is structured to be engaged by a user in actuating the key and a skirt surface adjacent the engagement surface;

each key of at least a portion of the number of keys comprising a first portion and a second portion, the first portion having a first surface, the second portion having a second surface, at least a portion of the first surface disposed adjacent at least a portion of the second surface being disposed oblique to the at least a portion of the second surface, at least a portion of the second surface being disposed adjacent at least a portion of the skirt surface, at least a portion of each of the first and second surfaces being at least a portion of the engagement surface of the key;

at least a portion of a first surface of a key disposed in a predetermined row and in a predetermined column being disposed adjacent at least a portion of a first surface of an adjacent key in the predetermined row;

at least a portion of the first surface of the key disposed in the predetermined row and in the predetermined column being offset in an actuation direction from at least a portion of an engagement surface of an adjacent key in the predetermined column and being disposed adjacent at least a portion of a skirt surface of the adjacent key in the predetermined column to provide a tactile distinction between the key disposed in the predetermined row and in the predetermined column and the adjacent key in the predetermined column; and at least a first key of the at least a portion of the number of keys additionally comprising a third portion, the at least a first key being disposed in a given row, the third portion comprising a tactile feature structured to provide a tactile distinction between the at least a first key and an adjacent key in the given row, the third portion having a third surface adjacent the first surface and adjacent the second surface, a portion of the third surface being part of the skirt surface.

2. The keypad of claim 1 wherein at least a portion of the tactile feature is disposed between the first surface of the at least a first key and the engagement surface of the adjacent key in the given row.

3. The keypad of claim 2 wherein the tactile feature is a protrusion that protrudes outwardly from the at least a first key.

4. The keypad of claim 3 wherein at least a portion of the tactile feature is disposed at a location adjacent the first surface.

5. The keypad of claim 1 wherein a second key of the at least a portion of the number of keys comprises a third portion, the second key being disposed in the given row, the third portion comprising a tactile feature structured to provide a tactile distinction between the second key and an adjacent key in the given row, the at least first and second keys being disposed in one of within a predetermined region of the keypad and adjacent the predetermined region, the tactile features of the at least first and second keys being structured to provide a tactile distinction between the keys disposed within the predetermined region and the keys disposed outside the predetermined region.

6. The keypad of claim 5 wherein at least a portion of the tactile feature of the at least a first key is disposed between the first surface of the at least a first key and the engagement surface of an adjacent key in the given row, and wherein at least a portion of the tactile feature of the second key is disposed between the first surface of the second key and the engagement surface of an adjacent key in the given row.

7. The keypad of claim 6 wherein a third key of the at least a portion of the number of keys is disposed in the given row and in a particular column between the at least first and second keys, the third key comprising a tactile feature, and wherein the tactile feature of the third key is disposed between the first surface of the third key and an adjacent key in the particular column.

8. The keypad of claim 5 wherein the second surface of the at least a first key includes a first lateral surface and a second lateral surface, the first lateral surface having a first profile and being disposed adjacent the first surface of the at least a first key, the second lateral surface having a second profile different than the first profile.

9. The keypad of claim 8 wherein the first lateral surface includes a fillet adjacent the first surface of the at least a first key, and wherein the second lateral surface is at least a portion of the skirt surface of the at least a first key.

10. The keypad of claim 8 wherein the second portion of the second key includes a first lateral surface and a second lateral surface, the first lateral surface of the second key having a first profile and being disposed adjacent the first surface of the second key, the second lateral surface of the second key having a second profile different than the first profile of the second key, the first lateral surface of the at least a first key and the first lateral surface of the second key facing generally toward one another, the first profiles being alike.

11. The keypad of claim 5 wherein the keys within the predetermined region of the keypad each have assigned thereto a character from among the ten Arabic digits, an asterisk, and a pound symbol, and are arranged in a touch-tone telephone layout.

12. The keypad of claim 5 wherein the keys within the predetermined region of the keypad are arranged in a touch-tone telephone layout and have telephone input characters assigned thereto.

13. The keypad of claim 12 wherein the keypad includes a first column of keys of the number of keys disposed adjacent the predetermined region and a second column of keys of the number of keys disposed adjacent the predetermined region, the predetermined region being disposed between the first and second columns.

14. The keypad of claim 12 wherein at least some of the keys in the predetermined region each have a number of linguistic elements assigned thereto, the telephone input characters being depicted on the keys on the first surfaces thereof, the linguistic elements being depicted on the keys on the second surfaces thereof.

15. The keypad of claim 1 wherein the third portion has a third surface, at least a portion of the third surface being at least a portion of the engagement surface, at least a portion of the third surface being disposed adjacent and substantially coplanar with at least a portion of the second surface.

16. A handheld electronic device comprising:

a processor apparatus including a processor and a memory;

an input apparatus structured to provide input to the processor apparatus;

an output apparatus structured to receive signal from the processor apparatus and to provide output;

the input apparatus including a keypad comprising a number of keys arranged in a plurality of rows and a plurality of columns, each key having an engagement surface that is structured to be engaged by a user in actuating the key and a skirt surface adjacent the engagement surface;

each key of at least a portion of the number of keys comprising a first portion and a second portion, the first portion having a first surface, the second portion having a second surface, at least a portion of the first surface disposed adjacent at least a portion of the second surface being disposed oblique to the at least a portion of the second surface, at least a portion of the second surface being disposed adjacent at least a portion of the skirt surface, at least a portion of each of the first and second surfaces being at least a portion of the engagement surface of the key;

at least a portion of a first surface of a key disposed in a predetermined row and in a predetermined column being disposed adjacent at least a portion of a first surface of an adjacent key in the predetermined row;

at least a portion of the first surface of the key disposed in the predetermined row and in the predetermined column being offset in an actuation direction from at least a portion of an engagement surface of an adjacent key in the predetermined column and being disposed adjacent at least a portion of a skirt surface of the adjacent key in the predetermined column to provide a tactile distinction between the key disposed in the predetermined row and in the predetermined column and the adjacent key in the predetermined column; and at least a first key of the at least a portion of the number of keys additionally comprising a third portion, the at least a first key being disposed in a given row, the third portion comprising a tactile feature structured to provide a tactile distinction between the at least a first key and an adjacent key in the given row, the third portion having a third surface adjacent the first surface and adjacent the second surface, a portion of the third surface being part of the skirt surface.

17. The handheld electronic device of claim 16 wherein a second key of the at least a portion of the number of keys comprises a third portion, the second key being disposed in the given row, the third portion comprising a tactile feature structured to provide a tactile distinction between the second key and an adjacent key in the given row, the at least first and second keys being disposed one of within a predetermined region of the keypad and adjacent the predetermined region, the tactile features of the at least first and second keys being structured to provide a tactile distinction between the keys disposed within the predetermined region and the keys disposed outside the predetermined region.

18. The handheld electronic device of claim 17 wherein memory includes a telephone routine that is executable on the processor, wherein the keys within the predetermined region are arranged in a touch-tone telephone layout and have telephone input characters assigned thereto, and wherein an actuation of a key within the predetermined region is adapted to provide a telephone input to the telephone routine.

19. The handheld electronic device of claim 18 wherein the keypad includes a first column of keys of the number of keys disposed adjacent the predetermined region and a second column of keys of the number of keys disposed adjacent the predetermined region, the predetermined region being disposed between the first and second columns.

20. The handheld electronic device of claim 18 wherein at least some of the keys in the predetermined region each have a number of linguistic elements assigned thereto, the telephone input characters being depicted on the keys on the first surfaces thereof, the linguistic elements being depicted on the keys on the second surfaces thereof.

* * * * *